May 18, 1937.    J. P. BUCKLEY    2,080,758
AUTOMATIC ACCOUNTING AND CHECKING SYSTEM
Filed Nov. 14, 1934    8 Sheets-Sheet 1

JOHN P. BUCKLEY.
Inventor

Ross J. Woodward
Attorney

May 18, 1937.  J. P. BUCKLEY  2,080,758
AUTOMATIC ACCOUNTING AND CHECKING SYSTEM
Filed Nov. 14, 1934  8 Sheets-Sheet 2

JOHN P. BUCKLEY.
Inventor

Ross J. Woodward
Attorney

May 18, 1937.  J. P. BUCKLEY  2,080,758
AUTOMATIC ACCOUNTING AND CHECKING SYSTEM
Filed Nov. 14, 1934   8 Sheets-Sheet 3

JOHN P. BUCKLEY.
Inventor

May 18, 1937.    J. P. BUCKLEY    2,080,758
AUTOMATIC ACCOUNTING AND CHECKING SYSTEM
Filed Nov. 14, 1934    8 Sheets-Sheet 5

JOHN P. BUCKLEY.
Inventor

Attorney

May 18, 1937.   J. P. BUCKLEY   2,080,758
AUTOMATIC ACCOUNTING AND CHECKING SYSTEM
Filed Nov. 14, 1934   8 Sheets-Sheet 6

FIG. 18.

JOHN P. BUCKLEY.
Inventor

Attorney

May 18, 1937.  J. P. BUCKLEY  2,080,758
AUTOMATIC ACCOUNTING AND CHECKING SYSTEM
Filed Nov. 14, 1934  8 Sheets-Sheet 8

JOHN P. BUCKLEY.
Inventor

Patented May 18, 1937

2,080,758

UNITED STATES PATENT OFFICE 2,080,758

AUTOMATIC ACCOUNTING AND CHECKING SYSTEM

John P. Buckley, Washington, D. C.

Application November 14, 1934, Serial No. 752,909

23 Claims. (Cl. 178—23)

This invention relates to an apparatus whereby desired information may be obtained from a distant point with a minimum loss of time and consists briefly of a sending station from which an inquiry may be electrically transmitted by an operator to a central office or station wherein is erected apparatus for automatically supplying the desired information which is electrically operated and has actuating mechanism set in motion by electrical impulses transmitted from the sending station.

Such an apparatus will be particularly serviceable in a large store having credit accounts as a clerk after making a sale can operate the mechanism at the sending station and practically immediately receive a response from the central office station indicating whether or not the customer has an account at the store and whether the customer's credit is good for the amount of the purchase.

One object of the invention is to provide an apparatus of this character including a dialing device at the sending station having printing means associated therewith for printing symbols in blank spaces provided upon a sales slip and also means for transmitting electrical impulses over a circuit to the central office station where mechanism will be actuated to print corresponding symbols upon a record strip or card, with signaling means being provided for indicating the various steps of the recording mechanism at the central station.

Another object of the invention is to so construct the apparatus that while the sending mechanism will be manually operated from a dial resembling a dial such as provided upon automatic telephones or similar apparatus, the mechanism at the central office station will be automatically operated by electrical impulses received from the sending station and a reply received without requiring the attention of a clerk at the central office station.

Another object of the invention is to provide an apparatus which is extremely accurate and very easy to operate.

The invention is illustrated in the accompanying drawings, wherein.

Briefly stated, this invention consists of sending apparatus located at a convenient point in a store so that it may be operated by a clerk who has made a credit sale of goods to be taken out by the customer and cooperating apparatus located in a central office. When a sale is made the clerk places the sales slip or a special blank on a carriage forming part of the apparatus at the sending station and operates the apparatus, during which operation symbols are printed or otherwise imparted to the sales slip and electrical impulses are simultaneously transmitted to the central office station where the apparatus at the central office will be operated to automatically determine whether the customer has an account at the store and whether or not the customer's account is good for the credit desired, the result being indicated by a signal received at the sending station. This can be accomplished in a few seconds' time and the customer will be relieved from annoying delays and loss of time by the clerk prevented.

Figure 1:
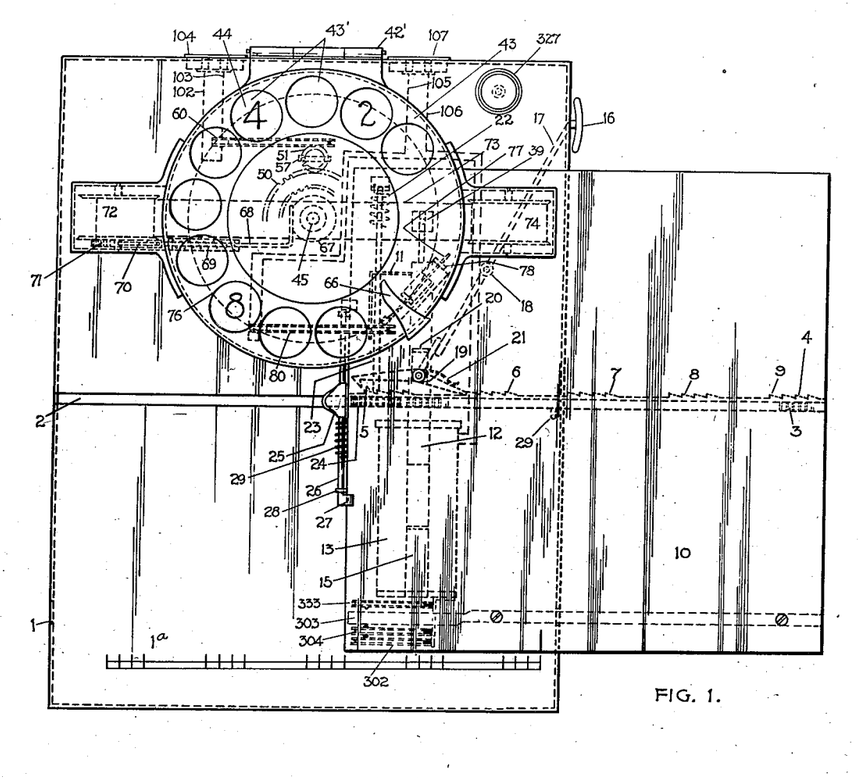
Figure 1 is a top plan view of the sending apparatus.
Figures 2, 3, 4, 5:
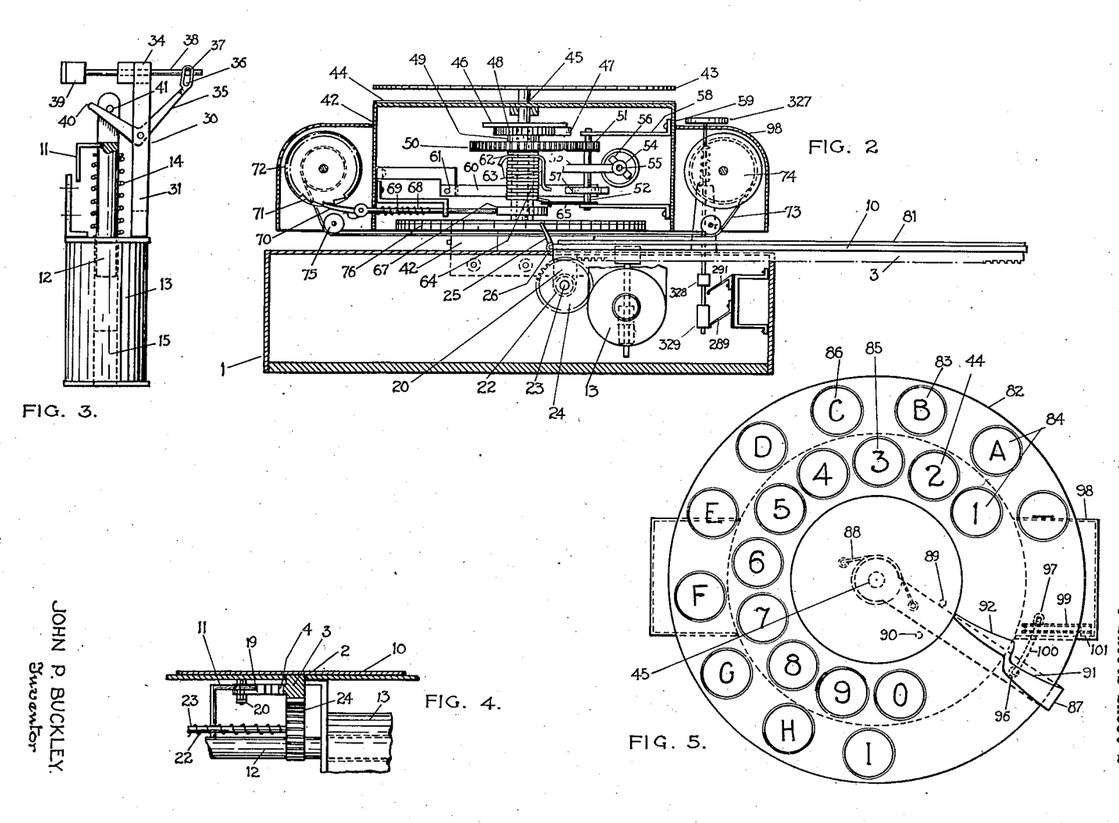
Figure 2 is a sectional view, taken vertically through the sending apparatus.
Figure 3 is a view in elevation of an escapement operating solenoid, together with striker mechanism by means of which a printing disk is caused to form symbols upon a sales slip or special sheet applied to the sending apparatus.
Figure 4 is a fragmentary sectional view of mechanism for imparting movement to the carriage plate carrying the sales slip and associated parts of Figure 3.
Figure 5 is a top plan view of a slightly modified form of dial and finger ring.

The apparatus at the sending station has a casing 1, the top or upper wall of which is formed with a slot 2 extending across the casing, as shown in Figure 1, and serving as a track for a rack bar 3 having its rack teeth formed upon its under surface and exposed in the casing through the slot, as shown in Figure 2. Ratchet teeth 4 are formed upon a side face of the rack bar and referring to Figure 1 it will be seen that these ratchet teeth are arranged in groups indicated by the numerals 5, 6, 7, 8 and 9. A plate or carriage 10 to which a sales slip is to be applied is fixed upon the upper face of the rack bar and moves across the top of the casing with the rack bar in step by step movements.

Step by step motion of the rack bar and carriage is electrically controlled by a solenoid 13 mounted in the casing transversely of the slot and having a core or armature 12 yieldably held against inward movement by a spring 14, as shown in Figure 3, and having its inward movement limited by a stop or plug 15 in the inner end portion of the solenoid. An arm 11 projects from the core 12 for engagement with the lug of a pawl 19 which is pivoted to a bracket 20 depending from the upper wall of the casing and yieldably held in normal engagement with the ratchet teeth of the bar 3 by a spring 21. Referring to Figures 1 and 4, it will be seen that when the solenoid is energized to retract the core 12, the pawl will be tilted about its pivot as an escapement and allow the carriage to move in a step by step movement. There has also been provided manually controlled means for operating the pawl consisting of a rocking arm or lever 17 which is pivoted at 18 and has one end disposed for engagement with the pawl and its other end portion projecting outwardly through an opening in a side wall of the casing and provided with a push button 16 for the operator to press upon in order to swing the lever about its pivot and cause the inner end of the lever to actuate the pawl. By having the ratchet teeth arranged in groups, the carriage will be moved short distances, then a longer distance for column spacing, and then have another series of short movements. Therefore, symbols can be formed upon a sales slip fixed to the carriage in column formation as will be hereinafter set forth.

The carriage is to be pulled toward the left after being shifted toward the right to the position shown in Figure 1 and this is accomplished by means of a shaft 23 which is rotatably mounted under the upper wall of the casing and provided with a spring 22 coiled about the shaft and having one end fixed to the casing and its other end to the shaft. When the carriage is slid toward the right to the position of Figure 1 and further movement in this direction stopped by the pin 29' projecting from the side of the bar 3, the spring will be wound and tensioned so that it tends to rotate the shaft in the opposite direction and move the carriage toward the left through the medium of the gear 24 fixed to the shaft and meshing with the rack teeth of the bar 3. By providing a scale 1ᵃ upon the upper wall of the casing 1 and cooperating mark upon the carriage, the position of the carriage and sales slip can be watched and proper printing upon the sales slip in columns assured.

The sales slip must be held firmly in place upon the carriage plate and, therefore, at one side of this plate there has been provided a paper holder consisting of a shaft 26 rotatably mounted in bearings 28 and carrying a handle 25 by means of which the shaft may be rotated to raise the claws or grippers 27 when pressure is applied and allow the sales slip to be slid into place under the claws. When the handle is released, the spring 29 coiled about the shaft rotates the shaft in the opposite direction and the claws will move into firm gripping engagement with the sales slip and prevent it from slipping out of its proper position upon the carriage plate.

Figure 10:
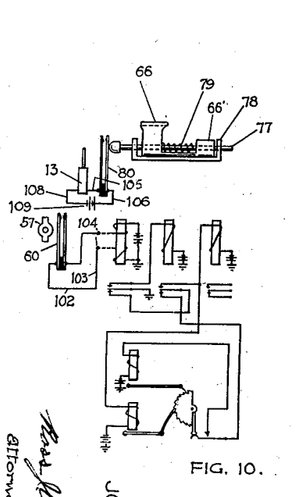
Figure 10 is a diagram showing the connection of a two-motion switch with the sending apparatus circuits.

The mechanism for imparting symbols to the sales slip is disposed over the casing 1 and has a housing 42 hinged at its rear end to the casing 1, as shown at 42'. A finger engaging ring or disk 43 formed with openings 43' about its circumference through which a card 44 carrying symbols is seen is fixed to the upper end of a main shaft 45 above the top of the housing. The shaft 45 is journaled vertically through the housing and within the housing carries a rigidly secured disk 46 to which is pivoted a pawl 47 having engagement with a ratchet wheel 48 carried by a cylindrical shaft 49 fitting loosely about the shaft 45 and rotatable thereon. A large gear 50 carried by the shaft 49 meshes with a pinion 51 carried by a countershaft 52, which shaft also carries a worm gear 53 meshing with a worm 54 of a shaft 55 having a governor 56 mounted thereon. The shaft 52 is rotatably mounted in brackets 58. A cam 57 formed of insulation is fixed to the shaft 52 and projects radially from opposite sides thereof, as shown in Figure 10 so that as the shaft 52 rotates in a return movement, the cam will be brought into and out of engagement with a leaf of a normally closed circuit-maker and breaker 60 having its resilient leaves insulated from each other, as shown at 61, and engaged by conductors 102 and 103 leading to a socket 104 at the back of the housing. This socket serves as an outlet whereby electrical impulses may be transmitted to a central office station. A collar 62 carrying an arm 63 is fixed to the shaft 45 for regulating operation of the switch 60. In order to control rotation of the shafts there has been provided a spring 64 which has one end anchored to the shaft 45 and its other end secured to an arm 65. By this arrangement an operator can insert a finger into a selected one of the openings 43' of the finger ring and turn the same until his finger engages the finger stop 66, the dial being then released by his finger moving onto the stop and the shaft 45 returning to its normal position so that the pawl 47 which has previously moved along the toothed edge of the ratchet 48 over a number of teeth corresponding to the number dialed, will impart rotation to the tubular shaft 49 and cause the shaft 52 to rotate a sufficient number of revolutions to open the switch 60 a corresponding number of times and send a predetermined number of electrical impulses to the central office station.

A printing disk 76 which may be referred to as a symbol carrier is fixed upon the lower end of the shaft 45 with a portion in overlying relation to the carriage 10 and this disk carries upon its under surface symbols corresponding to those exposed through the openings of the finger ring and each located in synchronized relation to its corresponding dial symbol when the finger ring is in its normal position.

An inked ribbon 73 of the type used upon typewriters, extends across the under face of the symbol carrier and is wound upon spools 72 and 74 and guided across the printing wheel or disk 76 by guide rollers 75. The ribbon is to be shifted longitudinally in step by step movements and in order to do so, the spool 72 is provided with ratchet teeth 71 or an independent ratchet wheel may be fixed to the shaft of this spool. A spring-pressed pawl 70, pivotally carried by a rod 68, engages the ratchet 71 and the rod is slidably supported by a bracket mounted in the housing 42 for movement through an opening in a side wall thereof. A spring 69 surrounding the rod yieldably resists outward movement thereof and holds the inner end of the rod in engagement with a cam 67 fixed to the shaft 45 and it will be readily seen that when the shaft is rotated during setting of the dial and printing disk, the ribbon will be shifted and cause a clear symbol to be imparted to the sales slip.

Formation of a symbol upon the sales slip is caused by a blow applied to the under face of the carriage and such a blow is delivered by a striker consisting of a rod 38 slidably mounted through a block 34 mounted between outer ends of spaced strips 31 forming a bracket 30 which is secured to the solenoid 13 and extends longitudinally therefrom. A head 39 is mounted at the upper end of the rod or shank of the striker and near its lower end the rod carries a transverse pin 37 received in slots 36 formed in forks of a bell-crank trigger 35 which is pivoted between the strips of the bracket 30 and has its arm 40 engaged by a pin 41 near the outer end of the plunger or armature 12 of the solenoid. By this arrangement, the trigger will be moved when the solenoid is energized to retract its plunger 12 and the striker actuated to drive it upwardly against the carriage plate and cause a symbol to be imprinted upon the sales slip by one of the symbols formed upon the printing disk or wheel 76. It will be understood that the printing disk is properly set whenever the dial is actuated and that the striker and carriage plate are moved in proper timed relation due to the fact that the solenoid is energized by the operator's finger engaging the finger stop 66 and shifting the finger stop out of its normal position.

The finger stop is formed of metal and has a finger engaging portion overlying the dial radially thereof, a depending portion at the outer end of the finger engaging portion, and an inwardly extending portion at the lower end of the depending portion which projects beneath the dial and carries a side extension terminating in a sleeve 66' secured to a rod 77 which is slidably mounted in a bracket 78 as shown in Figures 1 and 10. A spring 79 is disposed about the rod between the sleeve 66' and one end of the bracket and yieldably holds the finger stop in its normal position with its head in position to engage a leaf of the resilient circuit maker 80. This circuit maker has one leaf connected with one end of the solenoid coil by a conductor 105 and conductors 106 and 108 connect the second leaf of the circuit maker and the other end of the solenoid coil with a terminal plug 107 through which power is to be received from a suitable source 109. Referring to Figures 1 and 10, it will be readily seen that when the dial is actuated and movement thereof in one direction is stopped by the operator's finger engaging the finger stop, the stop will be shifted against action of the spring 79 to cause the headed end of the rod 77 to engage and close the circuit maker 80. Current will then flow through the coil of the solenoid 13 and its plunger will be momentarily retracted to cause the striker 38 to be actuated and also shift the carriage plate toward the left after a symbol has been printed upon the sales slip 81.

Figures 6, 7:
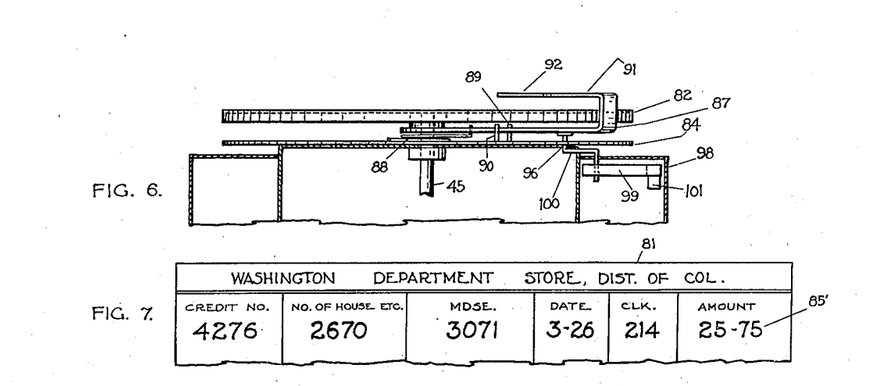
Figure 6 is a view showing the dial and associated parts partially in side elevation and partially in section.
Figure 7 is a view showing a sales slip with symbols marked thereon of sending mechanism having the dial shown in Figure 1.
Figure 9:
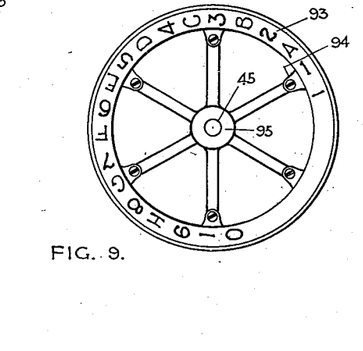
Figure 9 is a bottom plan view of a printing wheel or ring.

The dial shown in Figure 1 is only provided with numerals by which the sales slip may be marked, as shown at 85' in Figure 7. If it is desired to use letters or other symbols as well as numerals, a dial, such as shown in Figure 5 and indicated by the numeral 84 may be used. This dial has inner and outer circumferentially extending rows of symbols, the inner row being numerals, as shown at 85, and the outer row being letters, as shown at 86. The numerals correspond to the numerals of the dial shown in Figure 1 and are disposed in staggered relation to the letters. The finger ring 82 corresponds to the finger ring 43 and is formed with inner and outer rows of openings through which the letters and numerals are visible. This finger ring is carried by the shaft 45 and has associated with it a finger stop 87 which is pivoted upon the shaft and extends radially of the finger ring under the same with its outer end portion bent upwardly and then inwardly to overlie the finger ring. It should be noted, however, that the overhanging finger engaging portion of this stop is of irregular shape and provides finger engaging edge portions 91 and 92 disposed in operative relation to the inner and outer rows of symbols and openings. Therefore, when a finger is engaged in one of the outer rows of openings of the finger ring and the ring moved until the finger engages the edge 91 of the stop, the printing wheel 93, shown in Figure 9, will be turned to a position in which one of its letters will be moved into position to print the sales slip, whereas when the operator's finger is engaged in one of the inner rows of openings and the finger ring turned until the finger engages the edge 92 of the stop, the printing wheel will come to a stop in position for one of its numerals to print the sales slip. The printing wheel 93 is of sturdy construction, and referring to Figure 9 it will be seen that it has a rim upon which the numerals and letters are formed and a shaft engaging hub 95 connected with lugs 94 of the rim by spokes. The letters and numerals have been shown in Figure 9 as they will appear upon a sales slip for sake of clearness, but it will be understood that in actual construction they will be of the usual transposed formation.

A spring 88 yieldably holds the finger stop 87 in its normal position, and abutments 89 and 90 are provided to limit swinging movement of the stop. An arcuate slot 96 is formed in the dial 84 and through this slot extends a rod 100 which is bent outwardly under the dial and then downwardly to pass through an opening 97 formed in the top of a housing or casing 98 mounted at one side of the dial housing or casing 42. The inner lower end of the rod is connected with a leaf of a resilient circuit maker which has its two leaves insulated from each other, as shown at 101, and it will be readily seen that when the finger ring is actuated the circuit maker will be closed to energize the solenoid 13 the same as when the circuit maker 80 is closed.

Figure 8:
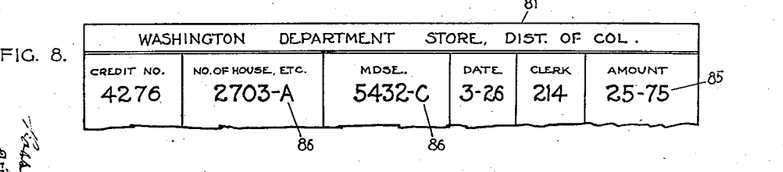
Figure 8 is a view similar to Figure 7 showing the sales slip marked by mechanism having the dial shown in Figure 5.

The operation of the sending apparatus will be readily understood from the above description, it being evident that when a sale is made the clerk will apply the sales slip to the carriage after drawing the carriage to the right, as shown in Figure 1, and will then operate the dial to print the account number in the first column of the slip, as shown in Figures 7 and 8, then to print the customer's residence number in the second column, after which the dial will be operated to print the number identifying the merchandise in the third column, then the date in the fourth column, the clerk's number in the fifth column and the amount of the sale in the sixth column. Any number of columns may be provided. Each time the dial is operated, the carriage is shifted toward the left after a symbol has been printed upon the sales slip, short movements being imparted to the carriage while printing in a column and a longer movement while traveling from one column to another. This movement of the carriage is controlled by the arrangement of ratchet teeth upon the rack bar. At the same time symbols are printed upon the sales slip, electrical impulses are set up by the circuit maker 60 during return of the dial to its neutral position and transmitted over the wires leading from the terminal 104 to the central office.

Figures 11, 12, 13:
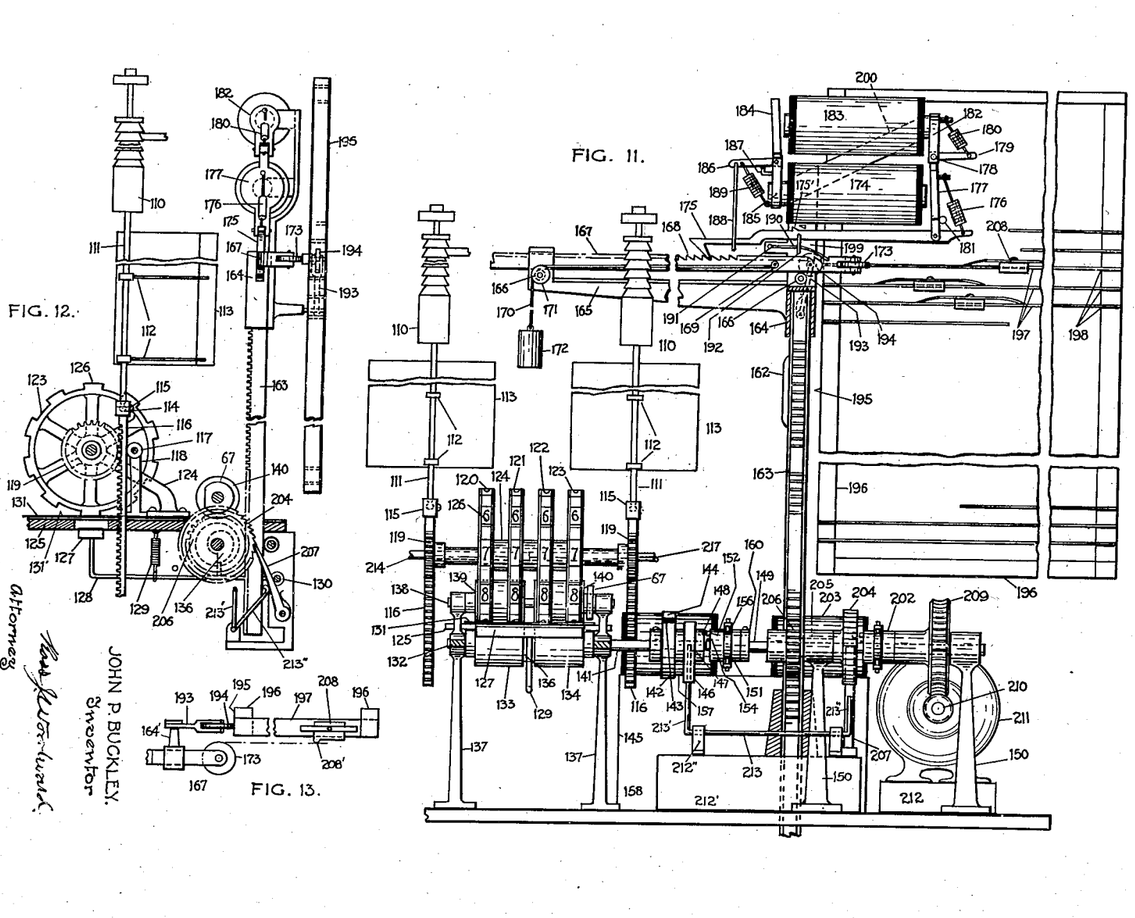
Figure 11 is a view in elevation of the apparatus in the central office station.
Figure 12 is a fragmentary view looking from the right in Figure 11 with parts omitted for sake of clearness.
Figure 13 is a fragmentary top plan view of an exploring arm and contact board forming part of the central office apparatus.

At the central office, the apparatus shown in Figures 11 and 12 is set up. This apparatus includes a series of two-motion switches 110. These switches are of the type used in automatic dial telephone systems and each has a vertically disposed rod 111 carrying the usual identifying arms 112 which move vertically with the rod along a bank 113 of terminals and then swing transversely of the terminals when the proper row of terminals has been reached. Ball and socket members 114 and 115 connect the lower end of each rod with the upper end of a rack bar 116 which is shifted vertically with the rod and guided in its movement by a roller 117 carried by a bracket 118. The rack bar meshes with a gear 119 and as the two-motion switches are operated, rotary motion will be imparted to printing wheels 120, 121, 122 and 123 which are provided upon their peripheral edge faces with symbols 126 corresponding to those upon the dial and printing disk of the sending apparatus. In the illustration the central station apparatus has been shown provided with four two-motion switches each of which has numerals thereon but it will be understood that any number of switches and printing wheels may be supplied and that they may be provided with letters or other symbols according to those upon the dial of the sending station. Shafts, which carry the printing wheels and will be more fully described later on, are mounted in brackets 124 fixed to a table 125.

Figures 14, 17:
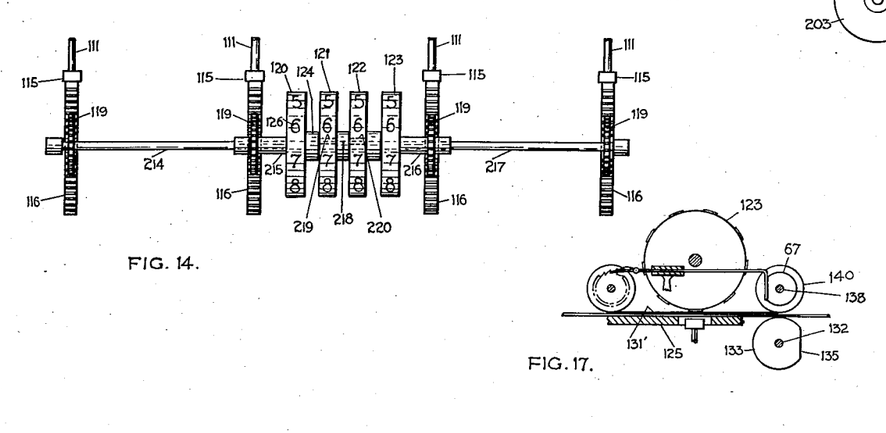
Figure 14 is a fragmentary view of the printing wheels and their shafts forming part of the central office apparatus.
Figure 17 is a view showing the paper feeding rollers and ribbon operating mechanism forming part of the central office apparatus.

A striker is associated with the table over which the printing wheels are mounted and consists of a shank or handle formed of a metal rod 128 disposed under the table and having at one end a head 127 movable through an opening in the table for forcing a strip of paper 131 and an inked ribbon 131', shown clearly in Figure 17, upwardly against the printing wheels. The inked ribbon is similar to the ribbon of the sending station and is shifted in step by step movements during operation of the central office apparatus, as shown in Figure 17. The shank or handle of the striker is pivoted at its rear end, as shown at 130, and a spring 129 between the shank and table yieldably holds the striker in its normal position.

Under the table is disposed a shaft 132 carrying rollers 133 and 134 for feeding the paper strip, and between the rollers is located a cam 136 having the shape shown in Figure 12 and engaging the handle of the striker to shift the striker in opposition to the spring 129 and then allow the spring to pull it back and deliver a blow. The shaft is mounted in standards 137 which also support an upper shaft 138 carrying rollers 139 and 140 disposed over the rollers of the lower shaft 132. Referring to Figure 17, it will be seen that the rollers 133 and 134 are each formed with a flat face 135 in order that as the rollers rotate the paper strip will be moved while arcuate portions of the edge faces of the lower rollers are engaged with the paper but brought to a stop during the time the flat faces are moving under the upper rollers. Therefore, symbols may be printed upon the paper strip while it is stationary and the paper then shifted to bring another portion into position under the printing wheels so that symbols can be printed thereon when the striker is again actuated.

The shaft 132 projects from one of the standards 137, as shown at 141, and extends through the hub 147 of an electrical contact metallic disk 142, in the peripheral edge face of which is set a block of insulation 143 which normally bears against an arm 144 pivoted to the base 145. A cam 146 is carried by the hub 147 in spaced relation to the disk 142 and by referring to Figure 11 it will be seen that the hub has one end terminating flush with the end of the shaft 132 and formed with a pin hole 148. A main drive shaft 149 is supported by standards 150 in alinement with the extended end of the shaft 132 and is connected therewith by a coupling 151 which is slidably mounted upon the shaft 149 and held against rotation thereon by a key 154 engaged in a keyway formed in the drive shaft. A pin 152 carried by the coupling engages in the pin hole or seat 148 of the hub when the coupling is shifted towards the shaft 132 and the two shafts may, therefore, be coupled and turn together.

Figures 21, 22, 23, 24:
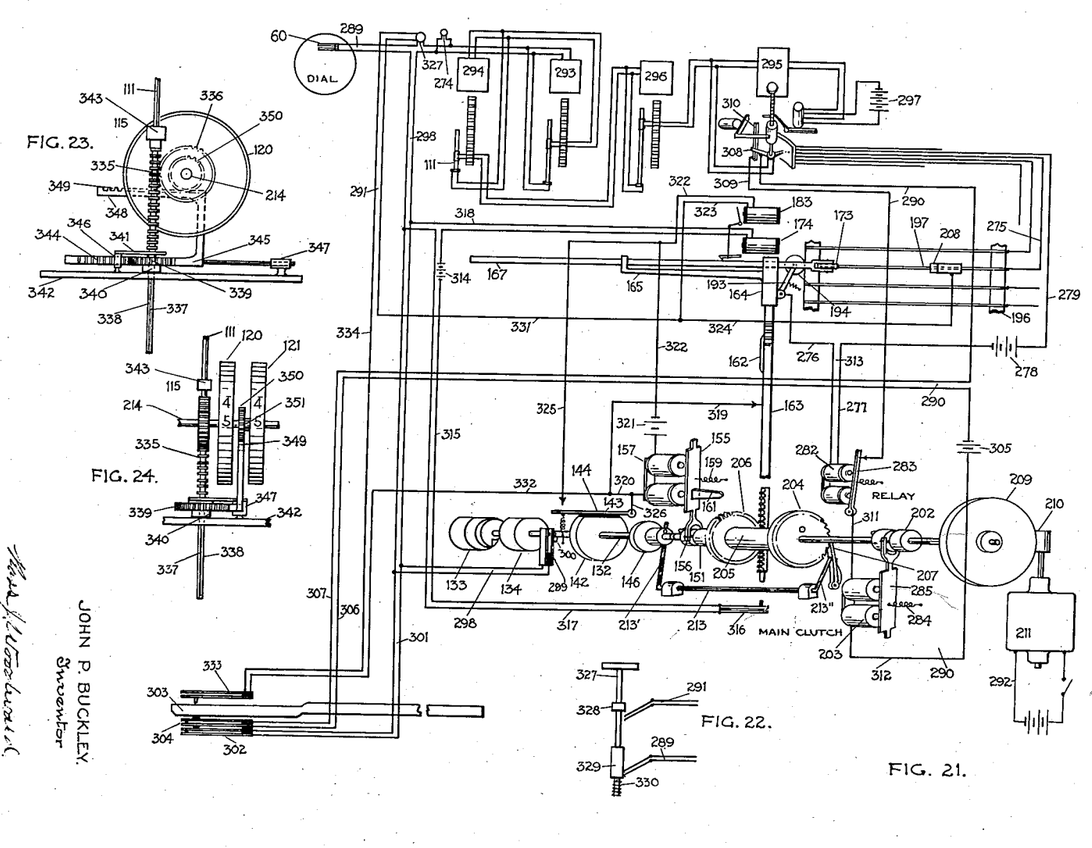
Figure 21 is a wiring diagram of the entire apparatus.
Figure 22 is a detail of a manually operated switch for clearing the central office apparatus from the sending station.
Figure 23 is a fragmentary side elevation of a modified form of the recording mechanism.
Figure 24 is a front elevation of the mechanism shown in Figure 23.

The actuating means for the coupling consists of an arm or lever 155, shown in Figure 21, which has forks 156 at one end engaging the coupling. This arm constitutes the armature of a magnet 157 mounted on a table 145 and is normally held away from the magnet with the clutch bearing against an abutment or stop 160 on the drive shaft by a spring 159. When the magnet is energized it holds the armature or arm toward it in position to close the clutch and cause the shaft 132 to turn with the drive shaft. An arm or extension 161 projects from the armature 155, as shown in Figure 21, and terminates in position for engagement by a cam strip 162 projecting from a side of a long rack bar 163 which may be termed an exploring element and has its teeth in mesh with a spur gear 206 carried by the tubular shaft 205 so that the exploring element will be shifted vertically when the spur gear is rotated in one direction. By providing the extension 161 and cam strip 162, the armature or clutch actuating lever 155 will be held in position to retain the clutch "thrown-in" to couple the shafts 132 and 149 for one complete revolution of the shaft 132 during initial upward movement of the exploring element.

At its upper end the exploring bar carries a head 164 from which projects a side arm 165 carrying spaced bearings 166 to slidably support a ratchet bar 167 having its teeth 168 upon its upper edge face. A cable 170 is attached at one end to a pin 169 projecting from the ratchet bar and after being extended longitudinally of the ratchet bar is engaged with a pulley 171 carried by the side arm 165. The depending end of the cable carries a weight 172 serving to normally hold the ratchet bar retracted and resist movement thereof toward the right in Figure 11 to an extended position across the insulating frame 196 which is disposed vertically at one side of the exploring bar and carries vertically spaced transversely extending conductors 197 mounted in grooves 198 formed in side bars of the frame.

Electrically energized means has been provided for imparting a step by step movement to the ratchet bar across the frame 196 and consists of a quick acting electro-magnet 174 disposed horizontally over the ratchet bar. A pawl 175 extends horizontally between the magnet and ratchet bar and is pivoted to the lower end of the armature 177 of the magnet. A spring 176 yieldably holds the pawl in position for the tooth at its free end to engage the teeth of the ratchet bar and a spring 180 which engages the arm 179 of the armature normally holds the armature swung about its pivot 178 away from the magnet to a position against the abutment 181 with the pawl shifted toward the right. The usual stop lug 175' is provided to prevent the rack bar from traveling too far when operated. When the electro-magnet is energized the pawl will be shifted toward the left with its toothed end sliding along the ratchet bar to obtain a fresh hold upon the ratchet bar and when the magnet is deenergized the spring 180 will again shift the pawl toward the right and advance the ratchet bar and its roller 173 across the insulating frame along a conductor 197 but out of engagement therewith. A detent 190 pivoted, as shown at 191, and engaging the teeth of the ratchet bar, prevents shifting of the bar to the left during movement of the pawl under influence of the electro-magnet. The hanger or bracket 182 to which the armature is pivoted is carried by the core of the slow acting electro-magnet 183 and the armature 184 of this magnet is disposed at the opposite end thereof and pivoted to a support 185 carried by the protruding core of the magnet 174. The armature 184 has an arm 186 projecting from its pivoted end and engaged by a spring 189 which yieldably holds the armature away from the magnet with its arm resting against the abutment pin 187. A grapple 188 depends from the arm 186 and engages the pawl 175 so that when the slow acting magnet 183 is energized, the pawl will be drawn upwardly out of engagement with the ratchet bar. At the same time, the grapple 192 carried by the pawl draws the detent 190 to a raised position and the ratchet bar will be released from both the pawl and detent so that the weight which exerts pull upon the cable 170 may slide the ratchet bar toward the left to a retracted neutral position. The magnets 174 and 183 are carried by a support 199 rising from the head 164 of the exploring bar 163 and a cross piece 200 connects cores of the magnets. The head of the exploring bar also carries an arm or harp 193 which is pivoted to a horn 164' in insulated relation to the head and carries a metallic roller 194 resiliently held in engagement with the side face 195 of the frame 196 so that it may make contact with exposed ends of the conductors 197 as the exploring bar is shifted vertically. It will thus be seen that when the exploring bar is shifted vertically the roller 194 will successively engage ends of the conductors 197 until the selected conductor is reached, at which instant the dialed circuit will be completed from the sending station through the selectors and from the connector 295 through the selected wire 275, conductor 197, wheel 194, insulated arm 193, wire 276, relay 282 and thence through the conductor 277 and battery 278 and wire 279 completing the circuit through the connector. The wires 279, 277 and 276 serve as common wires in the circuit. Closing of this circuit energizes the relay 282 to attract its armature at which instant the clutch circuit 290 will be open and the clutch magnet 203 deenergized for opening of the clutch.

The sending apparatus can now be dialed for the address and the ratchet bar will be shifted across the frame 196 longitudinally of the selected conductor. Each conductor carries a contact 208 which is shiftable along the same and if the contact of the selected conductor is in position for engagement of its projection 208' shown in Figure 13 by the roller 173 when the ratchet bar comes to a stop, a circuit will be established through the magnet 157 and move its armature 155 into position to close the clutch 151. More than one contact can be mounted on each conductor, if desired. A ratchet 204 is carried by the sleeve 205 which surrounds the drive shaft and is rotatably received in one of the standards 150. This sleeve also carries the spur gear 206 meshing with the exploring bar 163 and it will be readily understood that after the exploring bar has been shifted upwardly by rotation of the sleeve and spur gear, it will be held in a raised position by a detent 207 pivoted to the base 145 and yieldably held in engagement with the ratchet 204, as shown in Figure 12. Movement of the detent out of engagement with the rachet to permit the exploring bar to drop to a neutral position is accomplished through the medium of a rocker shaft 213 which is rotatably mounted in bearings 212" fixed to the portion 212' of the base 145 and has upstanding arms 213' and 213" at its ends disposed at an angle to each other, as shown in Figures 12 and 21. The arm 213" engages the detent 207 and the arm 213' bears against the edge face of the cam 146. Therefore, as the cam is rotated the rocker shaft will be turned in its bearings to a position causing the arm 213" to shift the detent out of engagement with the ratchet disk and with the clutch thrown out the exploring bar will be free to drop to the neutral position. Rotation in a direction to raise the exploring bar when the clutch is thrown in is imparted to the shaft 149 through the medium of a worm gear 209 fixed to the shaft and meshing with a worm 210 carried by the motor 211 which is mounted upon a base 212.

The printing wheels are to be independently rotated as their companion two-way switches are operated by electrical impulses transmitted from the sending station. Therefore, they are individually carried by shafts 214, 215, 216 and 217 carrying the gears 119 which mesh with the rack bars 116 of the two-motion switches. The shafts 214 and 217 to which the printing wheels 121 and 122 are secured by keys 219 and 220 are solid shafts disposed in alinement with each other with their inner ends abutting between the wheels 121 and 122 and the shafts 215 and 216 to which the printing wheels 120 and 123 are secured, are tubular shafts fitting loosely about the solid shafts 214 and 217. A sleeve 218 fits about adjoining ends of the solid shafts but does not interfere with independent rotation thereof. The bearings 124 for rotatably mounting the shafts, engage about the tubular shafts, one between the printing wheels 120 and 121 and the other between the printing wheels 122 and 123.

Figure 15:
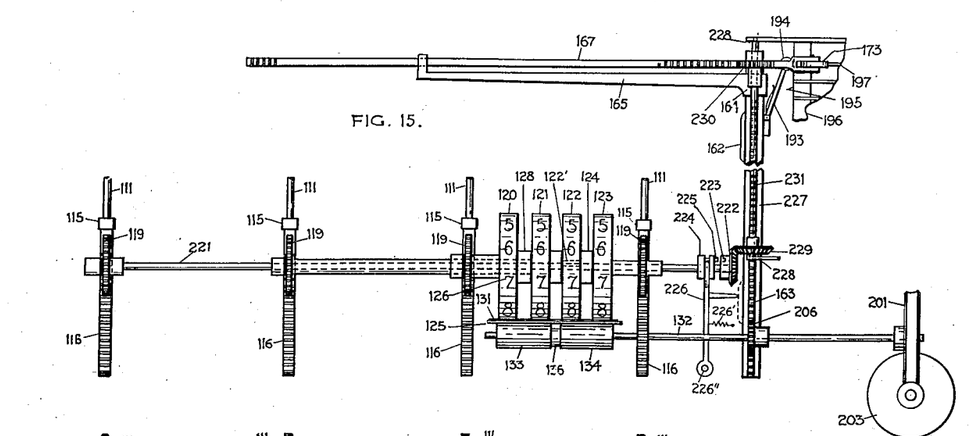
Figure 15 is a modified form of checking mechanism for the central office station.

Instead of having the ratchet bar 167 shifted across the insulating frame by the electro-magnets shown in Figure 11, the modified construction of Figure 15 may be employed. In this embodiment of the invention a continuous shaft 221 takes the place of the shafts 214 and 217 and carries the printing wheel 122 which is keyed to it by a key 122', the other printing wheels being carried by tubular shafts fitting about the shaft 221 with the shaft of the wheel 120 fitting about the shaft of the wheel 121.

Figure 16:
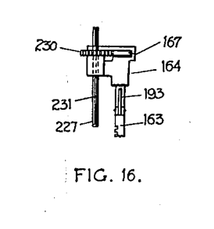
Figure 16 is a view of the upper end of the exploring arm of Figure 15 looking from one side thereof.

A beveled gear 222 is loosely mounted upon the end of the shaft 221 adjacent the exploring bar and held against shifting longitudinally of the shaft in any desired manner. A pin hole or seat 223 is formed in the hub of the gear 222 for receiving the pin 225 of the clutch 224. This clutch is actuated by a lever 226 which is pivotally mounted, as shown at 226'' and yieldably held in a normal position by a spring 226' with the clutch out of engagement with the hub of the gear 222 when the apparatus is in its neutral position. The gear 222 meshes with a beveled gear 229 fixed to a shaft which extends vertically in front of the exploring bar and is rotatably mounted in bearings 228 carried by the insulating frame. The shaft is formed with a longitudinally extending key way 231 into which fits a key of the spur gear 230 which is slidable along the shaft and held by the head 164 of the exploring bar, as shown in Figure 16. The spur gear meshes with the rack teeth of the bar 167 and thus the rack bar will be shifted across the insulating frame as the two-motion switch is energized by impulses received from the sending apparatus.

In Figures 23 and 24 there has been shown another arrangement of printing wheels and actuating means for the same. In these figures there has been shown a rack bar 335 which is circular in cross section and provided with annular teeth to mesh with the gear 336 fixed on the shaft 214. Below the teeth and slidably fixed in a keyway formed in a shaft 338, is the gear 339 held stationary in the bearing 340 by the arm 341 and table top 342. The rod 111 is rigidly attached to the rack bar by a joint 343. In this way the vertical movement of the two-motion switch is synchronized with the motion of the printing wheel 120 fixed on the shaft 214. The horizontal motion of the two-motion switch may also record its movement through the gear 339 meshing with the side teeth 344 of the bar 345, the bottom portion of which is slidably journaled in bearings 346 and 347. The top portion 348 of the bar has teeth 349 to mesh with the gear 350 which is fixed on the tubular shaft 351 supporting the printing wheel 121. As the rack bar 335 may rotate with the rod 111, as well as sliding vertically therewith, longitudinal movement of the rack bar 335 may turn the wheel 120 and rotation of the bar move the rack 345 to rotate the wheel 121.

Figures 19, 20, 25:
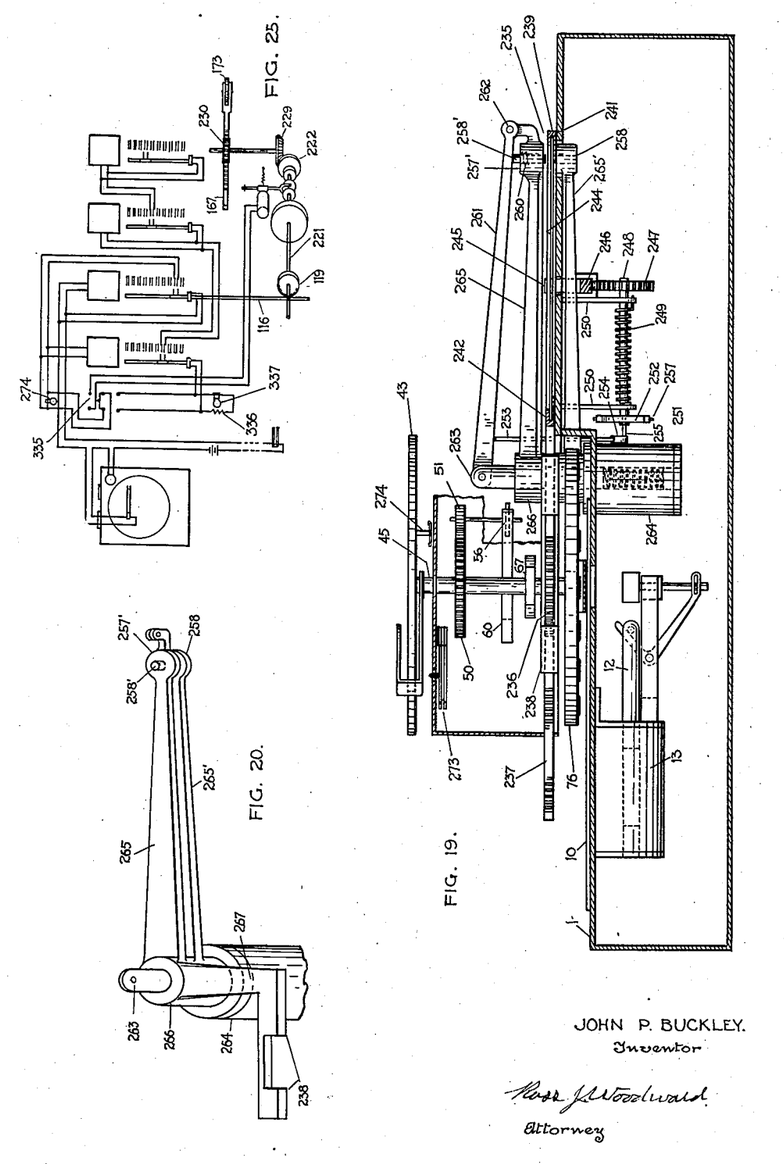
Figure 19 is a view partially in elevation and partially in section of the apparatus shown in Figure 18.
Figure 20 is a perspective view of a casting forming part of the card punching mechanism.
Figure 25 is a wiring diagram of a modified construction.

In Figure 25 there is illustrated a wiring diagram of a modified construction, wherein there is employed a double pole switch 335 for disconnecting one of the two-motion switches from the group to actuate the rack bar 116. In other respects the diagram is similar to that previously described, except that a resistance 336 and a lamp 337 are used to normally hold the current on while the dialing actuates the separated two-motion switches for operating the shaft 221.

Figure 18:
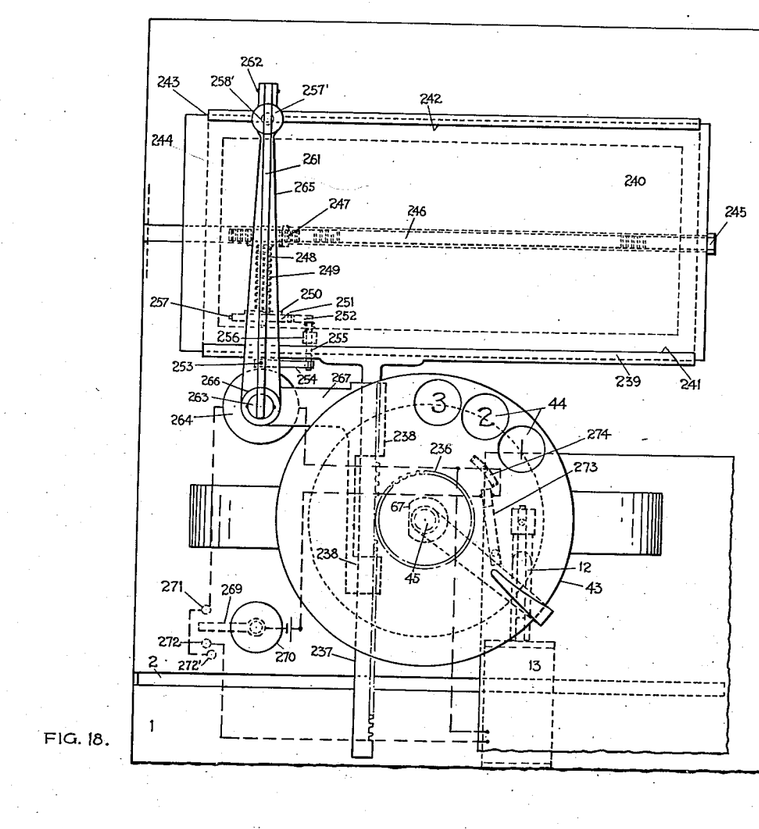
Figure 18 is a top plan view of a modified form of sending apparatus wherein a card punching mechanism is employed.

In addition to printing symbols upon the sales slip, perforations may be formed in a record card and in Figures 18, 19 and 20 there has been illustrated apparatus for carrying out this idea. Referring to these figures, it will be seen that to the shaft 45 has been secured a spur gear 236 meshing with a rack bar 237 which is slidably mounted in bearings 238. The rack bar carries a card holding frame 239 having its center portion cut out, as shown at 240. Flanges 241 and 242 along side edges of the frame define channels to receive edge portions of a card 244 and hold the card in place when thrust into the frame through the open end 243 of the frame. By having the rack 237 meshing with a gear fixed to the shaft 45, the frame 239 will be shifted when the finger ring is actuated. A rack bar 246 extends longitudinally of the card frame in the housing with one end bent upwardly, as shown at 245 to extend through a slot in the top of the housing for engagement with the card and this rack bar has teeth upon its under face which mesh with a gear 247 carried by a shaft 248. The shaft is rotatably mounted in bearings 250 depending from the top of the housing and is yieldably held against rotation in one direction by the spring 249 so that the frame will be urged towards the left in Figure 18 and step by step motion may be imparted to it. A ratchet 251 is fixed to the shaft for engagement by an escapement pawl 252 carried by one end of a short rocker shaft 255 which is rotatably mounted in bearings 256 and at its other end carries an arm 254 of resilient material. A rod 253 which extends vertically through the top of the housing has its lower end engaged with the arm 254 and it will be readily seen that when pressure is applied to the rod, the pawl will be moved to release the ratchet and permit the card frame to be moved in step by step movements toward the left.

The card perforating plunger 258' is slidably mounted in a socket 257' formed at the outer end of an arm 265 and yieldably held elevated by a spring 260. This plunger is to be forced through a card and into the lower portion 258 of a die carried by the arm 265'. This is accomplished by a lever 261 pivoted at one end, as shown at 262, and the lever also bears against the upper end of the rod 253. Therefore, the lever actuates both the rod and the plunger and they will be moved in proper timed relation to each other. The lever is pivotally connected with the upper end of the core or plunger 263 of the solenoid 264 which is mounted vertically through the upper wall of the housing, and referring to Figure 20 it will be seen that the arms 265 and 265' are cast integral with a sleeve 266 which fits loosely about the plunger 263 and carries an arm 267 acting as a support for the bracket carrying the bearing 238. By this arrangement the solenoid 264 may be energized at the same time the solenoid 13 is energized and by retracting the core 263 draw the lever 261 downwardly to force the plunger through the record card and shift the card frame in proper timed relation to printing of the sales slip and shifting of the carriage carrying the sales slip. A switch 269 having a turning knob 270 above the top of the housing is provided for selectively engaging the contact 271 or pair of contacts 272 and 272'. The switch 269 is connected with the circuit maker 273 which is in circuit with both solenoids 13 and 264 and closed by an abutment lug or shoe 274 on the under face of the finger ring. Referring to Figure 18, it will be seen that when the switch is engaged with the contact 271, only the card puncher will be operated. When the switch engages the contact 272 only the printing device will be operated and when the switch engages both contacts 272 and 272', the printing device and card puncher will both be operated.

Figure 21 is a schematic arrangement of the several electrical circuits in which is shown the two-motion switch circuit 289, the main clutch circuit 290, the release print circuit 291, and the motor circuit 292. The two-motion switch circuit is of the common kind used in the art of telephony. In this case the selectors 293, 294 and 296 and the connector 295 are electrically connected to the dial and the source 297 in the usual way. The leads 298 are attached to the normally closed spring circuit maker 299 which is automatically opened by the cam 300 with each turn of the roller shaft 132. This is done to automatically clear the two-motion switches.

The operator, wishing to record a sale of goods, notes the credit account number on the purchaser's card, in this particular case, let us say, the number reads 4276.

In dialing the number the digit "Four" is first brought around to the finger stop, which yields slightly backward to the pressure of the stroke, and, in the same instance, forms an electrical contact through the switch 80 as a terminal for the solenoid controlling the printing mechanism.

The conductors 105 and 106 electrically connect the normally open switch 80 and the solenoid 13 to the plug 107 through which power is received from an outside source.

The digit 4 having been brought around to the finger stop and the electrical contact having been made, the solenoid attracts its armature and causes the printing of this digit on the sales slip. The reverse rotation of the dial sends out four electrical impulses to the central office station mechanism through the normally closed switch 60 which is connected to the plug 104 by leaders 102 and 103. To the plug 104 are attached conductors of the circuit 289 which operates the selectors 293, 294 and 296 and the connector 295 and also the relay 282.

Dialing the numeral 4 raises the rod 111 four steps, the printing wheel being also moved four steps to bring its digit 4 into position for use. Each of the other two-motion switches and companion printing wheels are similarly moved.

The conductors 301 leading from the wires 298 of the two-motion switch circuit 289 are attached to circuit makers 302 and form a shunt for the circuit maker or switch 299 operated by the cam 300. The purpose of this shunt circuit is to hold current through the two-motion switches during the first revolution of the printing shaft. The circuit maker or switch 299 opens with each revolution of the printing shaft 132 but the shunt holds current through the two-motion switches so that the explorer will continue upward movement. Switch 144 is closed with each revolution of the shaft 132 by the cam 142 and the electromagnets 151 are energized to hold the armature 155 which was previously closed by the cam 162 pressing against the lug or arm 161. This gives predetermined movement of the shaft 132 which is one complete revolution. The cam bar 303 carried by the carriage plate 10 operates the circuit maker 302 for the shunt circuit 301 and also a circuit maker 304 for the main clutch circuit. When the bar is in the position shown in Figures 1 and 21 the circuit makers 302 and 304 are closed and held closed while a customer's credit number is being dialed. The clutch opens after this number has been dialed and the exploring bar has risen and come to rest where it is held by detent 207. In this illustration, the circuit makers 302 and 304 are not used when dialing for other numbers on the sales slip. 304 is a switch serving as an auxiliary control for the clutch circuit which consists of a source of power 305, a wire 306 leading therefrom to the circuit maker, a wire 307 leading from the circuit maker to the arm 308 of the connector 295, a wire 309 leading from the bar 310 to the armature 283, and a wire 311 leading to the clutch magnet 203 which is connected with the battery 305 by the wire 312. Whenever the connector is energized the arm 308 fastened to the rod 111 engages the metal bar 310 thereby energizing the clutch circuit. At this instant the clutch 202 engages the ratchet 204 and causes the exploring bar 163 to move upwardly until the roller 194 engages the conductor 197 selected by operation of the dial. When this occurs the connector circuit 313 is closed to energize the relay 282 and attract its armature 283 to break the clutch circuit and release the clutch so that the spring 284 opens the clutch. The signal light 274 now burns steadily to show that the account dialed is a live account. The operator now dials for the address in the second column of Figure 7 or Figure 8. The clutch circuit is still partially closed and remains partially closed until the first or second digit of the address is dialed, at which time the cam bar 303 will have advanced with the carriage so as to allow the two switches 302 and 304 to open. This is to prevent the clutch 202 from again imparting motion to the exploring bar 163. During completion of the dialing for the address, the ratchet bar 167 is shifted along the selected conductor 197 in step by step movements to bring the roller 173 into engagement with the contact 208 carried by this conductor. If this contact is set for the address given by being spaced away from the left hand end of the conductor a distance corresponding to the numerical value of the digits in the address, the roller will come to rest upon the contact 208 and close a circuit but if the roller should fall short of or overrun the contact, the circuit will not be closed as the electromagnet 174 is a quick acting magnet, while the release operating magnet 183 is a slow acting magnet. The magnet 174 controlling the ratchet bar 167 is operated through an auxiliary circuit of the two-motion switch circuit 289 and consists of the source 314 having a wire 315 leading to a circuit maker 316 which is opened by the lower end of the exploring bar when the exploring bar is in a lowered neutral position. A wire 317 leads from the circuit maker 316 and is attached to one of the wires 298 of the circuit 289. A wire 318 leads from the other wire 298 back to the magnet. When the exploring bar rises and moves away from the switch 316, this switch closes so that the magnet 174 can be successively energized each time the two-motion switches are energized and the ratchet bar advanced along the selected conductor 197 as the printing wheels are turned. If the address is represented by 2670, as shown in Figure 7, the printing disks will be turned to bring the proper symbols into position for printing this number and the ratchet bar will be successively moved a number of times corresponding to the numerals of the address when added together.

The code number may represent the number of the house, and include the number of the street or the numerical position of the first letter of the name of the street.

When the roller 173 rests on the contact 208, a circuit is formed through the roller 173, ratchet bar 167, explorer 163, wire 319, wire 320, electro-magnet 157, battery 321, wire 322 to release magnet 183 and then through wire 323 and wire 324 back to the contact 208. The slow acting magnet 183 will thus be energized to move the pawl 175 upwardly which, in turn, releases the detent 190 and the ratchet bar will be drawn back to its neutral position by the weight. As the electro-magnet 157 is energized the clutch 151 goes on and the shaft 132 will be rotated to close the switch 144 of the shunt circuit formed by the wire 325 leading from the wire 322 at one side of the battery 321, the electro-magnet 157 and lead 320 back to the switch 144 through the lead 326.

In order to manually control the two-motion switches and the electro-magnet 157 of the printing mechanism, there has been provided a switch 327 carried by the housing of the sending mechanism and operable by the clerk to clear the system if a mistake is made when dialing. As shown in Figures 2 and 22 this switch has a shank carrying a metal sleeve 328 for bridging and closing the circuit 291 through the magnet 157 of the printing mechanism. The switch also carries a metal sleeve 329 closing the circuit 289 of the two-motion switch but allowing this circuit to be broken when the switch is depressed its full extent. A spring 330 normally holds the switch raised with the circuit 289 closed and the circuit 291 open. Pressure upon the switch first closes the circuit 291 while allowing the circuit 289 to remain closed and additional pressure opens both circuits by the sleeves moving out of engagement with terminals of these circuits. The circuit 291 has one wire 331 leading to the wire 323 for establishing a circuit through the magnet 183, wire 322 to the battery 321, electro-magnet 157, wire 320, wire 332, switch 333 and wire 334 back to the switch 327. The switch 334 is located at the opposite side of the bar 303 from the switches 302 and 304 and will be closed when they are opened.

Having thus described the invention, what is claimed is:

1. In an apparatus of the character described, sending mechanism including means for registering symbols, manually controlled operating means for said means, means for carrying a form to receive the symbols having movement intermittently imparted thereto from said operating means, means actuated from said operating means for transmitting electrical impulses to a distant point after the symbols are registered, and electrically operated mechanism at the distant point energized by the electrical impulses for automatically registering corresponding symbols and operating a circuit maker and breaker of a circuit controlling operation of the mechanism at the said distant point.

2. In an apparatus of the character described, a sending mechanism including means for registering symbols, manually actuated operating means including a dial and a rotatable finger ring yieldably held in a normal position over the dial for said means, a carriage for carrying a form to receive the symbols having movement imparted thereto in timed relation to actuation of the means for registering symbols, and means actuated during return of the finger ring to its normal position for transmitting electrical impulses to a distant point.

3. In an apparatus of the character described, a sending mechanism including means for registering symbols, manually actuated operating means for said means, a carriage for carrying a form to receive the symbols having movement imparted thereto in timed relation to actuation of the means for registering symbols, a striker for effecting contact between a form and the means for registering symbols, and means actuated during operation of the operating means for transmitting electrical impulses to a distant point.

4. In an apparatus of the character described, a sending mechanism including means for registering symbols, manually actuated operating means including a single finger engaging element for said means, a carriage for carrying a form to receive the symbols mounted for movement under the means for registering symbols, means for controlling intermittent movement of said carriage having an electrically energized operating element in circuit with a switch actuated during actuation of the means for registering symbols, manually actuated means for effecting movement of the carriage, and means actuated during operation of the operating means for transmitting electrical impulses to a distant point.

5. In an apparatus of the character described, a sending mechanism including means for registering symbols, manually actuated operating means for said means, a carriage for carrying a form to receive the symbols mounted for movement under the means for registering symbols, means for controlling intermittent movement of said carriage having an electrically energized operating element in circuit with a switch actuated during actuation of the means for registering symbols, manually operated means for imparting movement to the means for controlling movement of the carriage, and means for transmitting electrical impulses to a distant point including a switch actuated during operation of the means for registering symbols.

6. In an apparatus of the character described, sending mechanism including a casing, a carriage for a blank shiftable across the casing and having a rack bar engaged through a slot in the upper wall of the casing, ratchet teeth being provided upon a side of the rack bar, means for urging the carriage across the casing in one direction including a spring actuated shaft geared to the rack bar, an escapement pawl engaging the ratchet teeth of the bar, an electrically energized operating element for said pawl, means for imparting symbols to a blank upon the carriage including a dial rotatably mounted above the carriage, a symbol carrier moving with said dial and disposed over the carriage adjacent thereto, a striker in said casing operating through the top thereof and moved by the electrically energized element into striking engagement with the carriage for imparting symbols to a blank by the symbol carrier, a switch for the circuit of the electrically energized element engaged and closed when the dial is moved to set the symbol carrier, a switch for an outgoing circuit, and means actuated from the dial for closing and opening the last mentioned switch in accordance with setting of the dial.

7. In an apparatus of the character described, sending mechanism including a casing, a carriage for a blank shiftable across the casing and having a bar provided with ratchet teeth, means for urging the carriage in one direction, an escapement pawl engaging the ratchet teeth for controlling such movement of the carriage, a striker in said casing, a solenoid in the casing operating the pawl and striker when energized, a switch for said solenoid, a symbol carrier over said casing overlying said carriage and movable to dispose a predetermined symbol over the carriage whereby a desired symbol may be imparted to a blank when the striker is operated, actuating means for the symbol carrier, a switch for the circuit of said solenoid, means for closing said switch when the dial is moved to set the symbol carrier and cause the striker and escapement pawl to be operated, and means for transmitting electrical impulses to a distant station including a switch closed and opened a predetermined number of times in accordance with setting of the dial.

8. In an apparatus of the character described, sending mechanism including a casing, a carriage for a blank shiftable across the casing and having a bar movable through the casing and provided with ratchet teeth, means for urging the carriage in one direction, an escapement pawl engaging the ratchet teeth for controlling such movement of the carriage, a striker in said casing, a solenoid in the casing operating the pawl and striker when energized, a housing over said casing, a shaft journaled vertically through said housing, a symbol carrier carried by said shaft and overlying said carriage whereby a desired symbol may be imparted to a blank when the striker is operated, a dial carried by said shaft for rotating the shaft and setting the symbol carrier, a switch for said solenoid, means for closing said switch moved to close the switch when the dial is set and having an actuating member positioned for engagement by a finger when operating the dial, a switch in said housing for an outgoing circuit, and means actuated from said shaft to effect closing and opening of the last mentioned switch in numerical accordance with setting of the dial whereby electrical impulses may be transmitted to a distant station.

9. In an apparatus of the character described, sending mechanism including a casing, a carriage for a blank shiftable across the casing and having a bar movable through the casing and provided with ratchet teeth, means for urging the carriage in one direction, an escapement pawl engaging the ratchet teeth for controlling such movement of the carriage, a striker in said casing, a solenoid in the casing operating the pawl and striker when energized, a housing over said casing, a shaft journaled vertically through said housing, a symbol carrier carried by said shaft and overlying said carriage whereby a desired symbol may be imparted to a blank when the striker is operated, a dial carried by said shaft for rotating the shaft and setting the symbol carrier, a switch for said solenoid, means for closing said switch moved to close the switch when the dial is set and having an actuating member positioned for engagement by a finger when operating the dial, spools carried by said housing for carrying a ribbon with a portion of the ribbon extending under the symbol carrier, means actuated from said shaft for turning one spool and shifting the ribbon when the dial is set, a switch in said housing for an outgoing circuit, and means actuated from said shaft to effect closing and opening of the last mentioned switch in numerical accordance with setting of the dial whereby electrical impulses may be transmitted to a distant station.

10. In an apparatus of the character described, a sending mechanism including means for printing symbols, manually actuated operating means for said printing means, a carriage for carrying a form to receive the symbols having operating means controlled by the manually actuated means, a second carriage having operating means controlled by the manually actuated means and adapted to carry a record card, means for perforating the card having operating means controlled by the manually actuated means, and means actuated during operation of the manually actuated means for transmitting electrical impulses to a distant station.

11. In an apparatus of the character described, a sending apparatus comprising means for emitting electrical impulses having actuating means including a dial and a rotatable finger ring, a movable finger stop, and means for making a record of a character dialed having electrically controlled operating means including a switch actuated by movement of the finger stop.

12. In an apparatus of the character described, a sending apparatus comprising means for emitting electrical impulses having actuating means including a dial and a rotatable finger ring over the dial, a movable finger stop, and means for making a record of a character dialed having electrically controlled operating means including a switch under the dial and an element for forcing the switch closed carried by the finger stop.

13. In an apparatus of the character described, a sending apparatus comprising means for emitting electrical impulses having actuating means including a dial and a rotatable finger ring, a movable finger stop, and means for making a record of a number dialed including a carriage for holding a blank, printing means, and means controlling movement of the carriage and printing on a blank, the last means being electrically operated and having a switch operated by movement of the finger stop.

14. In an apparatus of the character described, a sending apparatus comprising means for emitting electrical impulses having actuating means including a rotatable finger ring, a movable finger stop, and means for making a record of emitted impulses including a carriage for holding a blank, printing means, a second carriage for holding a blank, means for perforating a blank carried by the second carriage, and means for controlling movement of the carriages and the printing and perforating means actuated when the finger ring is moved.

15. In an apparatus of the character described, a sending apparatus including means for emitting electrical impulses having actuating means including a dial and a finger ring, a finger stop, movably mounted, carriages for blanks, printing means for one blank operated from said dial, perforating means for the other blank, the carriage for the last blank being also operated from the dial, electrically controlled operating means for the printing means and perforating means energized when the dial and finger stop are moved, and means for spacing the perforated card by stepped movement transversely of the direction in which its carriage moves.

16. In an apparatus of the character described, a central station mechanism including two-motion switches adapted to be actuated by electrical impulses and each having a rack bar connected therewith and shifted longitudinally when the companion two-motion switch is energized, printing wheels each associated with a rack bar and turned to a set position when the cooperating rack bar is moved, a rotatably mounted driven shaft, a cam rotating with said shaft, a striker actuated by said cam for driving a record blank against the printing wheels, a rotary drive shaft, a clutch for connecting said shafts normally held out and having electrically controlled operating means energized when the two-motion switches are energized, an insulating frame, conductors carried by said frame, contacts shiftable along said conductors, an exploring bar shiftable along said frame and having a contact for engaging the conductors, a gear for moving said bar, a clutch for connecting said gear with said drive shaft, electrical means for shifting said clutch, means for holding the bar raised having releasing means actuated from said driven shaft, a ratchet bar carried by said exploring bar for movement across the frame for engaging the contacts, and electrical means for controlling said ratchet bar controlled by the two-motion switches.

17. In an apparatus of the character described, a central station mechanism including two-motion switches each having a rack bar connected therewith and shifted longitudinally when the companion switch is energized, printing means actuated from the rack bars and having a striker associated therewith, a rotatable driven shaft having means for actuating said striker, a rotary drive shaft, a clutch between the shafts having electrical operating means, an insulating frame, conductors carried by the frame, contacts shiftable along said conductors, an exploring bar shiftable along said frame, a contact carried by said bar for engaging said conductors, a cross bar carried by said exploring bar and carrying a contact for engaging the contacts of the conductors, driving means for said exploring bar operated from the drive shaft and having a clutch and electrical means for operating the clutch, means for holding the exploring bar in a raised position having releasing means actuated by the driven shaft, and means for shifting the cross bar across the frame having electrical operating means controlled from the two-motion switches.

18. In an apparatus of the character described, two-motion switches each having a reciprocating rod and a rack moving therewith, printing wheels set from the racks, paper feeding means having a driven shaft, a drive shaft, a clutch for coupling said shafts, an insulating frame, spaced conductors carried by said frame, an exploring element shiftable from the drive shaft along said frame, a contact carried by said exploring element for engaging a selected conductor, contacts shiftable along said conductors, a cross bar carried by said exploring bar and shiftable across the frame for engaging the contacts of the conductors, means to support the exploring element in its raised position, and means to release the exploring element.

19. In an apparatus of the character described, a sending mechanism including a casing, a carriage for a blank shiftable across the casing and having a rack bar provided with ratchet teeth, means for urging the carriage across the casing in one direction, an escapement pawl engaging the ratchet teeth of the bar, an electrically energized operating element for said pawl, means for imparting symbols to a blank upon the carriage including a rotatably mounted dial, a symbol carrier moving with said dial, a striker in said casing moved by an electrically energized element into striking engagement with the carriage for imparting symbols to a blank by the symbol carrier, a switch for the circuit of the electrically energized element closed when the dial is moved to set the symbol carrier, a switch for an outgoing circuit, and means actuated from the dial for closing and opening the last-mentioned switch in accordance with setting of the dial.

20. In an apparatus of the character described, a sending mechanism including means for printing symbols, manually actuated operating means for said printing means, a carriage for carrying a form to receive the symbols having operating means controlled by the manually actuated means, a second carriage adapted to carry a record card and having operating means controlled by the manually actuated means, means for perforating the card having operating means controlled by the manually actuated means, means for selectively preventing actuation of the printing means, the perforating means and their companion carriages, and means actuated during operation of the manually actuated means for transmitting electrical impulses to a distant station.

21. In an apparatus of the character described, a sending mechanism having actuating means including a dial and a rotatable finger ring, a movable finger stop, and means for making a record of symbols dialed having electrically controlled operating means including a switch actuated by movement of the finger stop.

22. In an apparatus of the character described, a sending mechanism comprising means for emitting electrical impulses having actuating means including a dial and a shiftable finger engaging member, a movable finger stop, means for making a record of characters dialed including a carriage for holding a blank, scoring means, and electrically operated means for controlling movement of the carriage having a switch operated by movements of the finger stop.

23. In an apparatus of the character described, a sending mechanism comprising means for emitting electrical impulses having actuating means including a dial and a shiftable finger engaging member, a movable finger stop, means for making a record of characters dialed including a carriage for holding a blank, scoring means, electrically operated means for controlling movement of the carriage having a switch operated by movements of the finger stop, and manually actuated means for controlling movements of the carriage.

JOHN P. BUCKLEY.